US009071134B2

(12) United States Patent
Harriman et al.

(10) Patent No.: US 9,071,134 B2
(45) Date of Patent: Jun. 30, 2015

(54) POWER SUPPLY CONTROLLER HAVING SELECTABLE PWM AND RPM MODES AND METHOD THEREFOR

(75) Inventors: Paul J. Harriman, Belfair, WA (US); Rong-Shyang Ou, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 921 days.

(21) Appl. No.: 13/017,597

(22) Filed: Jan. 31, 2011

(65) Prior Publication Data

US 2012/0194159 A1 Aug. 2, 2012

(51) Int. Cl.
*G05F 1/00* (2006.01)
*H02M 3/156* (2006.01)
*H02M 1/00* (2007.01)

(52) U.S. Cl.
CPC ...... *H02M 3/156* (2013.01); *H02M 2001/0032* (2013.01); *Y02B 70/16* (2013.01)

(58) Field of Classification Search
USPC .......... 323/234, 237, 241–242, 282–285, 288
See application file for complete search history.

(56) References Cited

U.S. PATENT DOCUMENTS

| 6,362,608 | B1 | 3/2002 | Ashburn et al. |
| RE38,140 | E | 6/2003 | Schaffer |
| 6,674,274 | B2 | 1/2004 | Hobrecht et al. |
| 6,922,044 | B2 | 7/2005 | Walters et al. |
| 7,019,502 | B2 | 3/2006 | Walters et al. |
| 7,057,381 | B2 | 6/2006 | Harriman et al. |
| 7,595,617 | B2 * | 9/2009 | Schiff ........................... 323/282 |
| 8,058,859 | B2 * | 11/2011 | Xu ................................. 323/284 |
| 8,339,814 | B2 * | 12/2012 | Zhang et al. ............... 363/21.12 |
| 2006/0028188 | A1 | 2/2006 | Hartular et al. |
| 2007/0013356 | A1 * | 1/2007 | Qiu et al. ..................... 323/288 |
| 2008/0116865 | A1 | 5/2008 | Rice |
| 2008/0284398 | A1 * | 11/2008 | Qiu et al. ..................... 323/283 |
| 2009/0072807 | A1 * | 3/2009 | Qiu et al. ..................... 323/285 |
| 2009/0218999 | A1 * | 9/2009 | Kikuchi ....................... 323/282 |
| 2010/0033261 | A1 * | 2/2010 | Stevenson et al. ........... 332/109 |
| 2010/0052583 | A1 * | 3/2010 | Takamatsu et al. ...... 318/400.09 |
| 2011/0279153 | A1 * | 11/2011 | Zhu et al. ..................... 327/131 |
| 2012/0049824 | A1 * | 3/2012 | Chen et al. ................... 323/283 |

* cited by examiner

*Primary Examiner* — Jeffrey Gblende
(74) *Attorney, Agent, or Firm* — Robert F. Hightower

(57) ABSTRACT

At least one exemplary embodiment is directed to a method of switching between synchronous and nonsynchronous ramp control. An embodiment may include a power supply controller that has a trigger circuit configured to generate an RPM trigger, a timer circuit configured to generate a clock signal, and a switching circuit configured to switch a modulation mode responsively to the clock signal and the RPM signal.

20 Claims, 5 Drawing Sheets

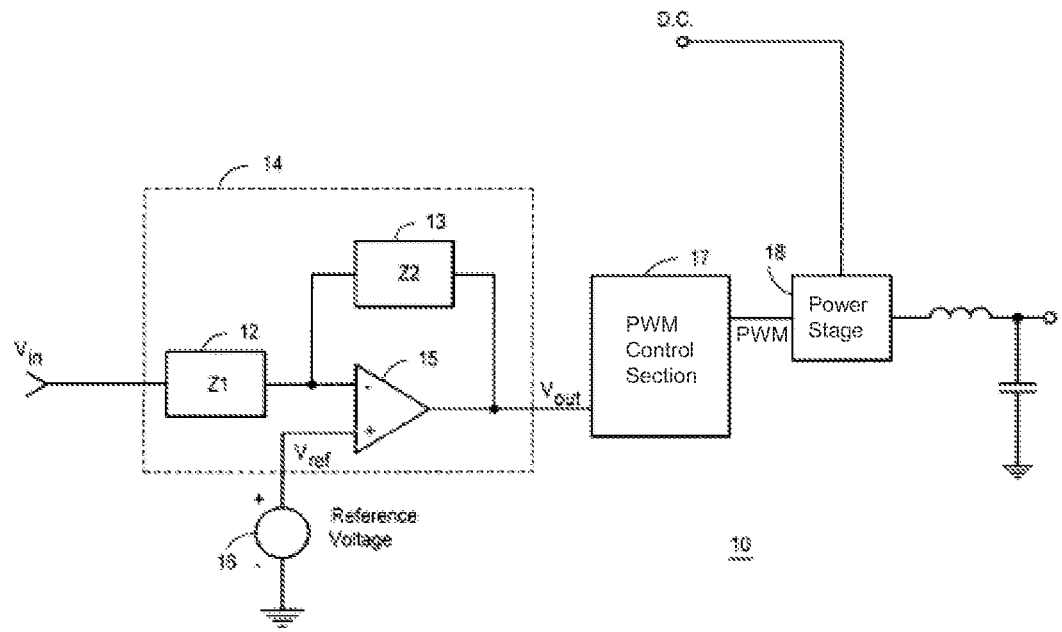
FIG. 1
(Related Art)
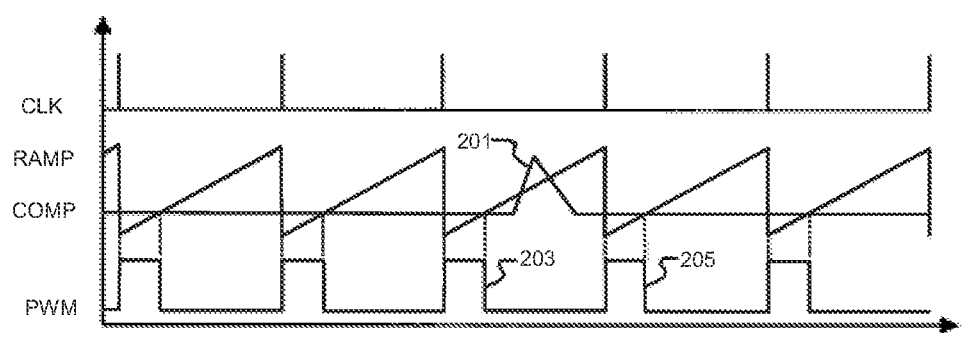
FIG. 2 Trailing Edge Modulation (Related Art)

US 9,071,134 B2

1

POWER SUPPLY CONTROLLER HAVING SELECTABLE PWM AND RPM MODES AND METHOD THEREFOR

FIELD OF THE INVENTION

The present invention relates in general, to electronics, and more particularly though not exclusively, to power supply controllers, to semiconductors, structures thereof, and methods of forming semiconductor devices.

BACKGROUND OF THE INVENTION

A variety of electronic devices such as portable computers, portable phones, personal digital assistants, and other portable and non-portable electronic devices may utilize one or more DC to DC converters. DC to DC converters generally convert an input DC voltage to a regulated output DC voltage. A DC to DC converter may be utilized to serve a variety of loads within an electronic device. The load served by the DC to DC converter may vary from a relatively light load to a relatively heavy load. The distinction between a light and heavy load may vary based on a particular application, system, and/or user requirement.

Different types of DC to DC converters may be more suitable for serving light or heavy loads. A linear mode voltage regulator may be one type of DC to DC converter that is more suitable to providing power to light loads. The linear mode voltage regulator may monitor changes in output DC voltage and provide a control signal to a transistor to hold the output voltage at the desired value. One type of a linear mode voltage regulator may be a low drop output voltage regulator (LDO) that can provide power to a relatively light load with relatively little voltage drop and with a low noise output. Another type of DC to DC converter may be a switch mode DC to DC converter that holds the output voltage at a desired value by turning at least one transistor of the DC to DC converter ON and OFF. Such a switching type of DC to DC converter may provide a regulated output voltage at a relatively high efficiency when serving a heavy load.

A conventional method that served a load that can be either a light or heavy load under differing conditions provided one DC to DC converter, for serving the light loads, and provided another separate DC to DC converter, e.g., a switching mode DC to DC converter, that served the heavy loads and switched over between each DC to DC converter under certain circumstances. Such a conventional method required two DC to DC converters and additional components and pins to facilitate switching between each adding cost and complexity.

The load current of a modern central processing unit (CPU) is highly dynamic and changes very quickly from low to high and from high to low. A CPU current transient may occur within 1 microsecond, for example, which is less than the typical switching period of conventional voltage regulators.

In the conventional pulse-width modulation (PWM) scheme, the compensation (COMP) output of the error amplifier is typically compared to a fixed ramp signal by a PWM comparator, which generates a PWM signal used to control switching of a DC-DC power regulator. To provide switching noise immunity, a reset-set (R-S) flip-flop is often coupled to the output of the comparator to ensure that there is only one pulse for each switching cycle. A leading-edge modulation scheme is good for the load-adding transient event but not always responsive to a load-releasing transient, while a trailing-edge modulation scheme is good for the load-releasing transient event but not always responsive to a load-adding

2 transient event. Each of these conventional schemes, therefore, inserted clock signal delays under certain load varying situations.

Often, systems required the ability to change the value of the output voltage of the power supply system under the control of an external control system such as a micro-computer. The external control system typically sent a signal to the power supply control system in order to change the value of the output voltage. FIG. 1 illustrates an error amplifier of a typical prior power supply control system 10. System 10 had a PWM control section 17, a power driver stage 18, an error amplifier 14, and a reference voltage 16. Error amplifier 14 included an operational amplifier 15 in addition to a compensation and gain control network that included a first impedance 12 and a second impedance 13. Impedances 12 and 13 typically included resistors and capacitors that were used to provide high frequency stability for changes in the input voltage (Vin) applied to amplifier 14. One problem with these power supply controllers was accuracy. Often, the error amplifier circuit had tracking errors which caused the output voltage to have inaccurate and unstable changes when the control system requested a change in the value of the output voltage. Such inaccuracy and instability detrimentally affected the operation of the control system that used the output voltage of the power control system.

When two DC-DC converters are present on the same input filter ripple current can be an issue, and it becomes important during dynamic loading to respond to transients immediately.

Accordingly, it is desirable to have a system that can reduce input filter ripple current without creating voltage disturbances on the output voltage.

BRIEF DESCRIPTION OF THE DRAWINGS

Exemplary embodiments of present invention will become more fully understood from the detailed description and the accompanying drawings, wherein:

FIG. 1 illustrates an error amplifier of a power supply control system;

FIG. 2 illustrates a series of timing diagrams illustrating a trailing-edge modulation scheme;

DETAILED DESCRIPTION OF THE DRAWINGS

Figure 3:
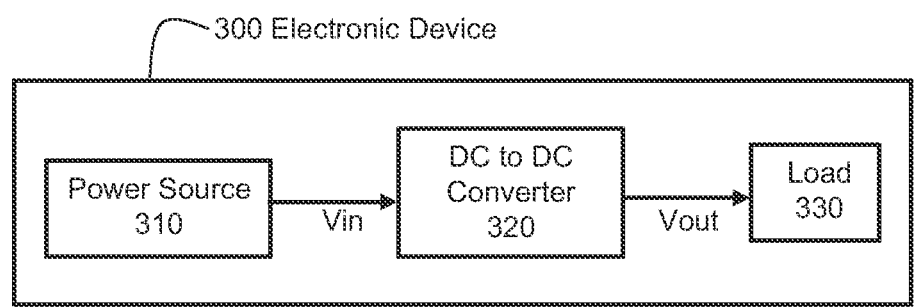
FIG. 3 illustrates a block diagram of an electronic device in accordance with at least one exemplary embodiment.

The following description of exemplary embodiment(s) is merely illustrative in nature and is in no way intended to limit the invention, its application, or uses.

For simplicity and clarity of the illustration(s), elements in the figures are not necessarily to scale, are only schematic and are non-limiting, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor.

It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of duration of the initiating action. The use of the word "approximately" or "substantially" means that a value of an element has a parameter that is expected to be close to a stated value or position. However, as is well known in the art there are always minor variances that prevent the values or positions from being exactly as stated. When used in reference to a state of a signal, the term "asserted" means an active state of the signal and inactive means an inactive state of the signal. The actual voltage value or logic state (such as a "1" or a "0") of the signal depends on whether positive or negative logic is used. Thus, "asserted" can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used.

The terms "first", "second", "third" and the like in the Claims or/and in the Detailed Description are used for distinguishing between similar elements and not necessarily for describing a sequence, either temporally, spatially, in ranking or in any other manner. It is to be understood that the terms so used are interchangeable under appropriate circumstances and that the exemplary embodiments described herein are capable of operation in other sequences than described or illustrated herein.

In addition, the description illustrates a cellular design (where the body regions are a plurality of cellular regions) instead of a single body design (where the body region is comprised of a single region formed in an elongated pattern, typically in a serpentine pattern). However, it is intended that the description is applicable to both a cellular implementation and a single base implementation.

Processes, techniques, apparatus, and materials as known by one of ordinary skill in the art may not be discussed in detail but are intended to be part of the enabling description where appropriate. For example specific methods of signal ramping and cock signal triggering may not be listed for achieving each of the steps discussed, however one of ordinary skill would be able, without undo experimentation, to establish the steps using the enabling disclosure herein. Such processes, techniques, apparatus, and materials are intended to fall within the scope of at least one exemplary embodiment.

Notice that similar reference numerals and letters refer to similar items in the following figures, and thus once an item is defined in one figure, it may not be discussed or further defined in the following figures.

When two DC-DC converters are present on the same input filter it is useful to reduce input filter ripple current by interleaving the time that each converter draws current from the input filter. During dynamic loading it is important to respond to transients immediately and not wait the normal time required for interleaving. At least one exemplary embodiment is directed to a system that can transition between synchronous operation and non synchronous operation and perform this action without creating voltage disturbances on the output voltage.

FIG. 2 is a series of timing diagrams illustrating a trailing-edge modulation scheme. The Clock (CLK) pulses are shown at the top, the RAMP and COMP signals are shown superimposed in the middle, and the resulting PWM signal is shown at bottom. The RAMP signal for this scheme exhibits repetitive positive-going ramps and is also known as an up ramp signal. As shown, the CLK signal turns on each PWM pulse while the trailing-edge of each pulse of the PWM signal is determined by the RAMP signal compared to the COMP signal. A similar load transient causes a corresponding transition on the COMP signal as shown at 201. Once the prior PWM pulse 203 is turned off, however, the PWM signal stays in the off state until the end of the switching cycle at the next CLK pulse, resulting in turn-on delay. In this case, there is little or no response to the COMP transition 201 occurring after the trailing-edge and prior to the next rising edge of the PWM signal for the next pulse 205. This turn-on delay results in higher voltage spike during the load-applying transient event.

FIG. 3 illustrates a block diagram of an electronic device 300 in accordance with at least one exemplary embodiment, which can have a power source 310, a DC to DC converter 320, and a load 330. The electronic device 300 may be a variety of devices such as a laptop computer, CPU (computer processing unit), portable phone, personal digital assistant, and other electronic devices that use DC to DC converters. The power source 310 can be any variety of power sources such as a battery, e.g., a lithium battery, for providing unregulated DC voltage (Vin) to the DC to DC controller 320. The DC to DC converter 320 can provide a regulated output DC voltage (Vout) to the load 330. Although only one DC to DC converter 320 and one associated load 330 is illustrated for clarity, the electronic device 300 can have a plurality of DC to DC converters serving any plurality of loads.

Figure 4:
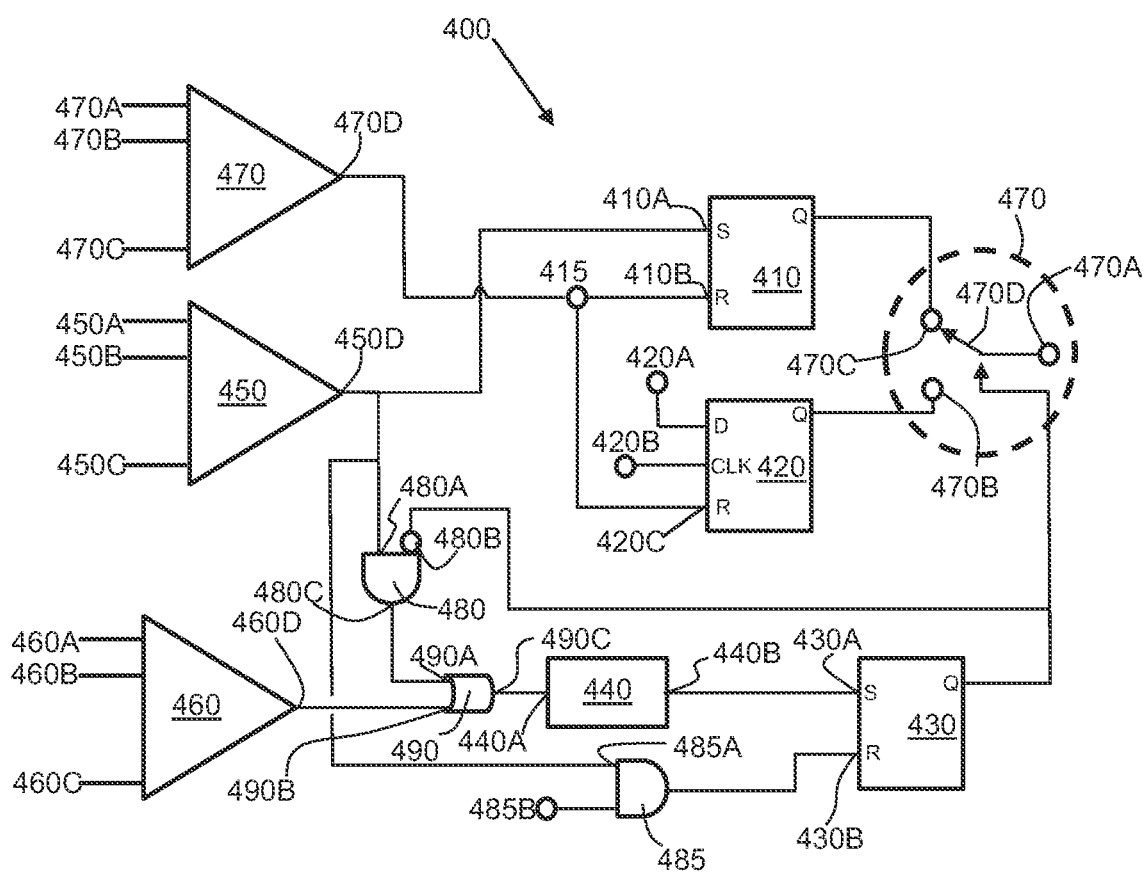
FIG. 4 illustrates a ramp control circuit in accordance with at least one exemplary embodiment.
Figure 5:
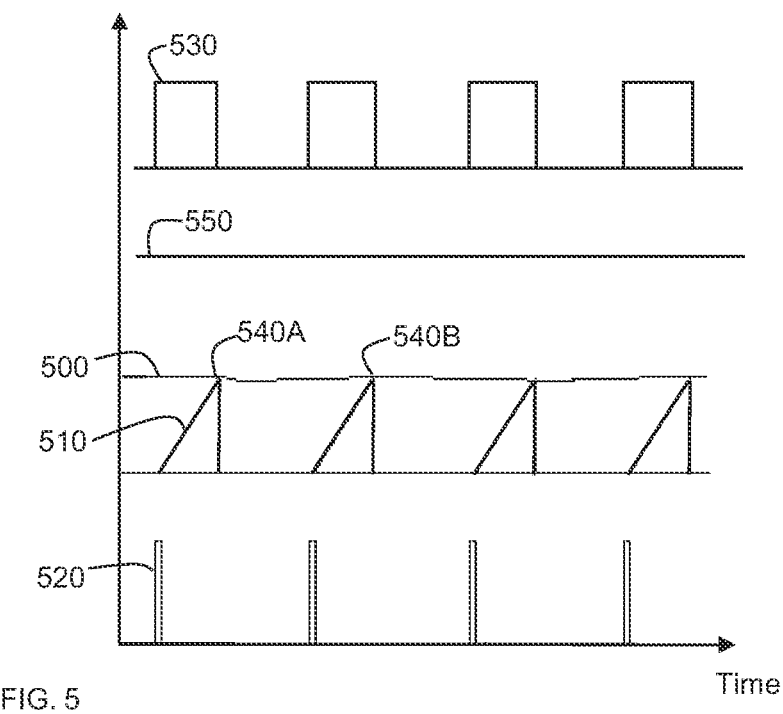
FIG. 5 illustrates a steady state trailing edge signal operation in accordance with at least one exemplary embodiment.
Figure 7:
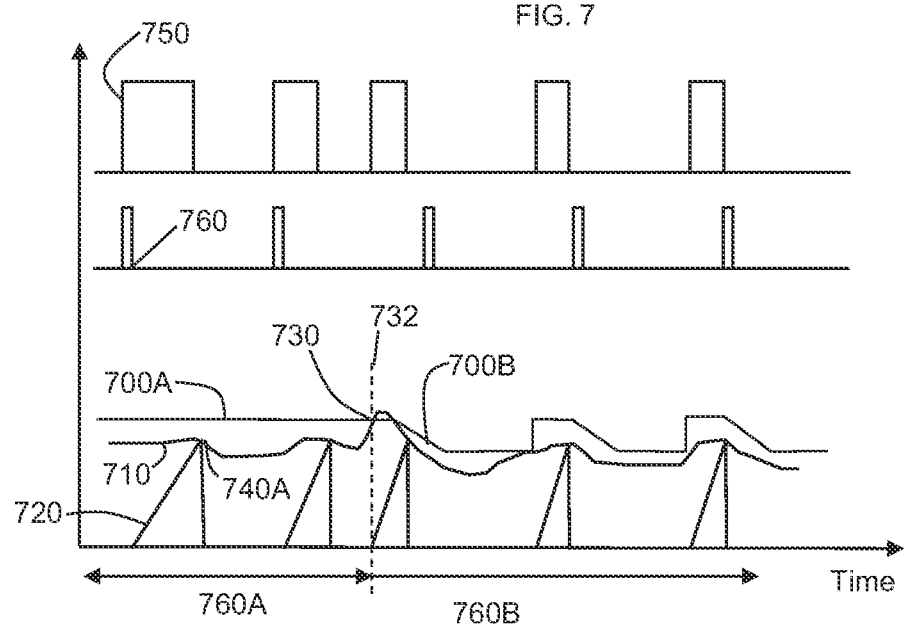
FIG. 7 illustrates a first dynamic RPM trigger event in accordance with at least one exemplary embodiment.
Figure 8:
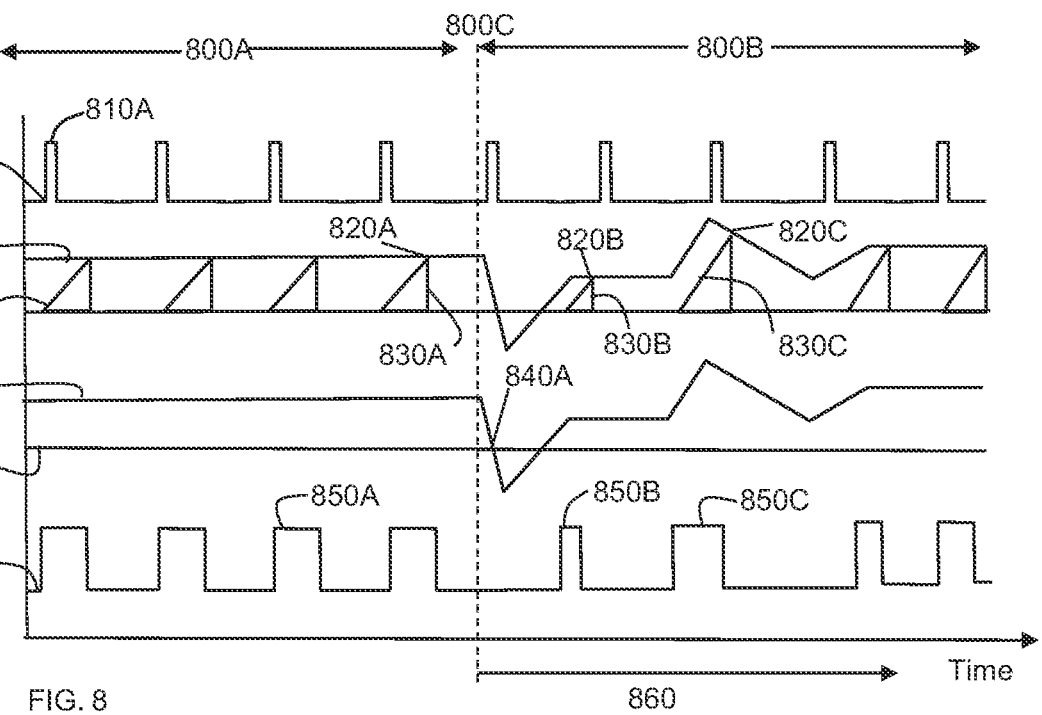
FIG. 8 illustrates a second dynamic RPM trigger event in accordance with at least one exemplary embodiment.
Figure 9:
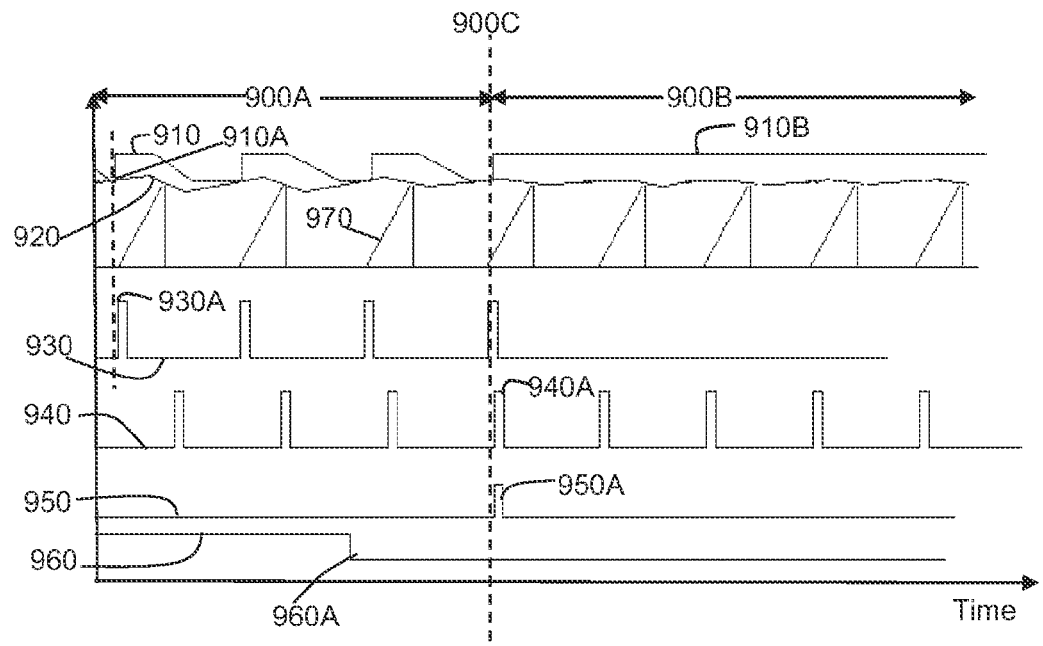
FIG. 9 illustrates a return to normal operation in accordance with at least one exemplary embodiment.

FIG. 4 illustrates a ramp control circuit 400 in accordance with at least one exemplary embodiment. The ramp control circuit 400 controls a common ramp and controls the trigger of the ramp based on a synchronous clock (e.g., 485B, 420B) or an error signal (e.g., 450A, 460A). During steady state operation the ramp is triggered by the synchronous clock 420B as illustrated by signal 520 in FIG. 5. In the event of a load transient as shown in FIG. 7 or FIG. 8 the circuit will switch to RPM operation for a period of time to respond to dynamic load. After the system is settled and timer 440 in FIG. 4 has expired, when the RPM trigger and the synchronizing clock are both high at the same time, the circuit switches back to synchronous operation as shown in FIG. 9 with minimum impact to the output ripple voltage.

The ramp control circuit 400 can include an RPM trigger amplifier 450 that compares an error signal 450A with an RPM trigger threshold 450C and an optional inductor current 450B to determine whether an RPM trigger signal 450D is generated. The ramp control circuit also includes a ramp comparator amplifier 470 to compare the error signal 470A and optional inductor current signal 470B to the ramp signal 470C to determine when to reset the modulator latches 410 and 420 to terminate the PWM signal 470A and reset the ramp. The ramp control circuit also includes the RPM trigger comparator amplifier 450 to trigger the non-synchronous control latch 410, a load release comparator amplifier 460 which compares the error signal 460A and an optional inductor current signal 460B to a reference signal 460C. Control circuit 400 includes an optional timer 440 which when activated sends a signal to activate latch 430 which in turn causes switch 470 to select non-synchronous mode RPM operation. Timer 440, when included, maintains the non-synchronous mode of operation for a set minimum period of time. Logic gate 480 gates or blocks the RPM trigger signal 450D to prevent timer 440 from being reset while control circuit 400 is operating in non-synchronous RPM operation. Logic gate 490 combines the gated RPM trigger comparator signal 490A with the load release comparator signal 460D to create the timer reset signal 490C. Error signals 470A, 450A and 460A are substantially the same and would for example be generated by error amplifier 14 as shown in FIG. 1. Inductor current signals 470B, 450B, and 460B are substantially the same and would be representative of the inductor output current sensed in a typical manner as known by one of ordinary skill in the art, such as inductor current sensing, or using a sense element in series with the inductor.

In steady state operation control circuit 400 remains in synchronous mode. If an output load transient occurs error signal 470A responds and triggers a transition to RPM mode. FIGS. 7 and 8 illustrate two non-limiting examples of an RPM mode triggering event in which an RPM trigger signal 450D is sent.

Figure 6:
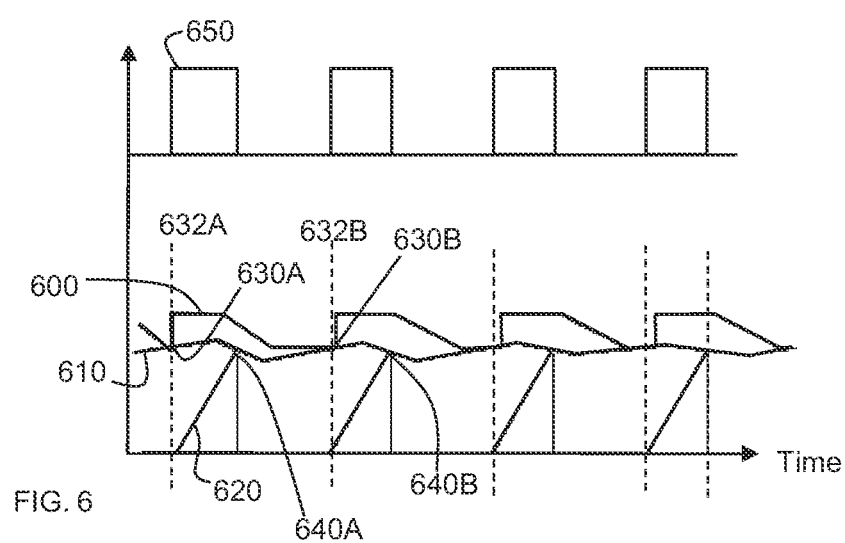
FIG. 6 illustrates a Ramped Pulse Modulation (RPM) signal operation in a accordance with at least one exemplary embodiment.

FIG. 7 illustrates two operation modes, a synchronization mode 760A using a clock and a non-synchronous mode 760B. The synchronous mode of operation is illustrated in detail in FIG. 5. In synchronous mode a synchronized clock signal triggers the onset of a ramp signal 510 and the onset of PWM signal 530. When the ramp signal 510 intersects the error signal 500 at 540A the ramp signal and the PWM signal reset until the onset of the next clock signal 520. The RPM Threshold signal 550 remains in a high state during synchronous operation (e.g., 760A FIG. 7). The non-synchronous mode of also referred to as the RPM mode of operation is illustrated in FIG. 6. Non-synchronous mode is also referred to as the RPM mode. RPM mode is triggered, in the non-limiting example illustrated in FIG. 6, when the error signal 610 intersects with an RPM Threshold signal 600, the ramp signal onset occurs independent of a clock signal onset, hence RPM is not clock limited and is a non-synchronous method of PWM control. When the ramp signal onset occurs the RPM Threshold resets to a high threshold state.

FIG. 7 illustrates the transition to RPM mode from a synchronous mode of operation 732. While in synchronous operation 760A the RPM threshold signal remains in a high state. In the event of a transient load increase error signal 710 responds by increasing resulting in an intersection of the error signal 710 with the RPM threshold signal 700A which in turn triggers comparator amplifier 450 resulting in circuit 400 transitioning to the RPM mode of operation 760B and the onset of a ramp signal and the PWM signal.

A further non-limiting example of an RPM triggering event is illustrated in FIG. 8. During synchronous mode operation 800A a transient load reduction event occurs resulting in a reduction in error signal 820 triggering comparator amplifier 460 which results in circuit 400 transitioning to non synchronous mode operation 800B. While in synchronous mode operation 800A clock signal 810 has periodic signal 810A which triggers the onset of the ramp signal 830, the ramp signal 830 resets 830A when the ramp signal intersects 820A the error signal 820. The synchronous signal high values 810A trigger the onset of high values 850A of a pulse width modulation (PWM) signal 850. The temporal extent of the high value (e.g., 850A) is determined by the time from onset of a ramp signal to when a ramp reset occurs (e.g., when the ramp signal intersects an error signal). For example the temporal extent of the PWM pulse 850B and 850C are determined by the time between ramp onset and resets of ramp signals 830B and 830C respectively. At 800C a transient load event occurs on the output and the error signal 820 responds buy decreasing, when the error signal which may be combined with a current signal 460B falls below load release threshold 840 at 840A as detected by amplifier 460 in FIG. 4 the output of timer 440 will be reset resulting in latch 430 being set. When latch 430 is set the RPM mode of operation is selected by switch 470. The dynamic event 840A on error signal 820 in FIG. 8 could for example have been caused by a sudden reduction in load.

Switching from nonsynchronous mode to synchronous mode is illustrated in FIG. 9. For example FIG. 9 illustrates the RPM threshold signal 910 where the intersection 910A of the error signal 920 triggers a ramp operating in non-synchronous mode 900A. An RPM Trigger signal 930 high value 930A (in at least one further exemplary embodiment a low value) is triggered upon the intersection 910A. Subsequent intersections in nonsynchronous mode result in high value of the RPM trigger signal 930. In the background the synchronous signal 940 continues to generate synchronous high value 940A pulses triggered by a clock. While in nonsynchronous mode 900A the pulse values of the synchronous signal 940 are ignored for ramp onset. FIG. 4 illustrates a non-limiting example of a ramp control circuit 400. The synchronous signal from a clock is input 420B into edge modulator latch circuit 420, and into the AND gate 485 via input 485B. When the AND gate 485, with inputs from the synchronous signal 485B and the input 485A from the RPM Trigger signal 450D returns a value of true, the true value is sent to reset the RPM_GO latch 430. Latch 430 is of the set dominate type and will only reset if timer 440 has expired 960A. Resetting latch 430 switches circuit 400 back to synchronous mode without substantially disturbing the periodic ramp signal 970. The switch from nonsynchronous mode to synchronous mode is discussed below with reference to FIG. 9. In summary a timer 440 is started by the onset of the nonsynchronous mode. The timer 440 triggers signal 440B for a predetermined time interval (for example 40 μsec) that is input into the RPM_GO latch circuit 430. When timer signal 440B is true into the RPM_GO latch circuit 430 the operation mode is then switched from synchronous mode to non-synchronous mode by sending a signal to switch 470 which then selects the output of the non-synchronous RPM modulator control latch 410 to control of the ramp signal and the PWM signal. FIG. 9 illustrates the signals involved in switching from nonsynchronous mode to synchronous mode. The switch between nonsynchronous mode 900A and synchronous mode 900B occurs upon the onset of a high (or low) value 950A of a reset signal 950 only after timer 440 has expired if optional timer 440 is included. For example FIG. 9 illustrates that the RPM GO signal 960 should have a low value 960A (in at least one further exemplary value a high value can be used) when a high or low value 950A of the reset signal occurs for switching to occur between the nonsynchronous mode 900A to the synchronous mode 900B. In the synchronous mode the onset of a ramp signal is controlled by the high (or low) value 940A pulse signals of the synchronous signal 940. The low value 960A in this non limiting example is triggered by a timer (e.g., 440 FIG. 4) which is started upon the onset (e.g., 732 FIG. 7) of the non synchronous mode 900A. For example the timer can be set to various intervals for example 40 μsec.

Figure 10:
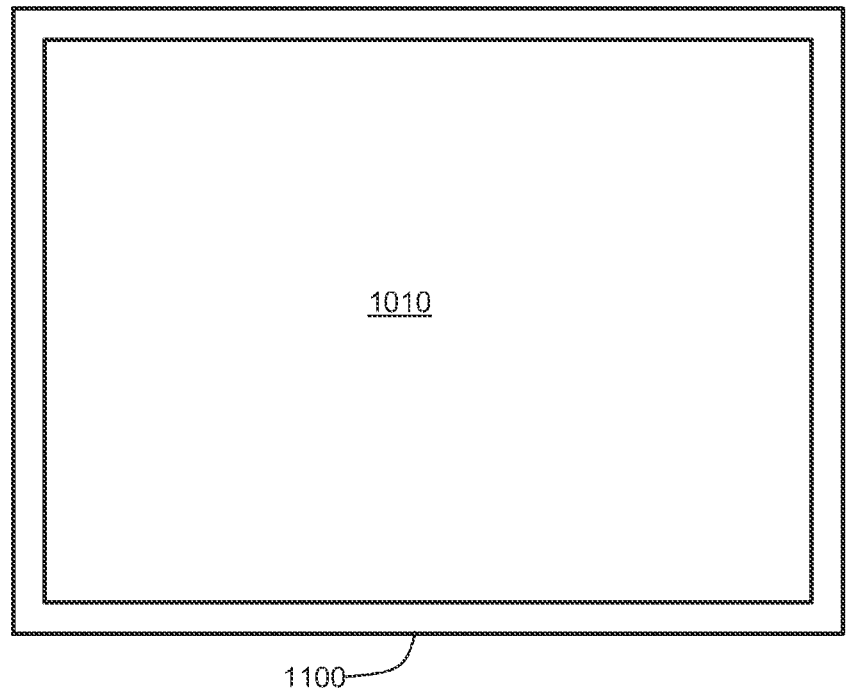
FIG. 10 illustrates a top view of a ramp control circuit in accordance with at least one exemplary embodiment.

FIG. 10 illustrates a top view of a ramp control circuit 1010 in accordance with at least one exemplary embodiment. FIG. 10 illustrates an enlarged plan view of a portion of an embodiment of a ramp control circuit 1010 that is formed on a semiconductor die 1100. Die 1100 may also include other circuits that are not shown in FIG. 10 for simplicity of the drawing. Ramp control circuit 1010 is formed on die 1100 by semiconductor manufacturing techniques that are well known to those skilled in the art.

Further Exemplary Embodiments

At least one exemplary embodiment is directed to a method of controlling a power supply system having an output voltage comprising: generating an error signal (e.g., 820, 920) representative of the output voltage; generating a threshold signal (e.g., 840, 910); comparing the error signal to one or more threshold signals; switching the modulation type from a first modulation mode to a second modulation mode when the error signal passes (e.g. intersects 840A, 910A) the threshold signal at a given time, where the first modulation mode is one of an RPM modulation mode (e.g. 760B, 800B, 900A) and a synchronous modulation mode (e.g. 800A, 900B), and where the second modulation mode is different than the first modulation mode and where the edge modulation mode is a synchronous modulation method such as trailing edge modulation or leading edge modulation mode.

At least one further exemplary embodiment is directed to a power supply controller comprising: a RPM modulator circuit (e.g. RPM modulator latch circuit 410), the RPM modulator circuit controls a RPM modulator mode and where the RPM modulation mode is a first modulation mode; a Trailing Edge modulator circuit (e.g. edge modulator latch circuit 420), the Trailing Edge modulator circuit controls a Trailing edge modulator mode (e.g. 800A, 900B) and where the Trailing Edge modulation mode is a second modulation mode; and a switching circuit (e.g., switching circuit 470), where the switching circuit switches the modulation mode from the second modulation mode to the first modulation mode when an error signal (e.g. 610, 710, 820, 920) passes a threshold signal. In at least one exemplary embodiment the condition where the error signal passes the threshold signal occurs when the error signal exceeds a threshold signal (e.g. error signal 710 exceeds threshold 700A). In at least one exemplary embodiment the condition where the error signal passes the threshold signal occurs when the error signal is lower than a threshold signal (e.g. error signal 820 becomes lower than threshold 840).

At least one exemplary embodiment is directed to a power supply controller comprising: a RPM trigger circuit (e.g. RPM trigger amplifier 450), where the RPM trigger circuit generates an RPM trigger signal (e.g. 450D); a timer circuit, where the timer circuit generates a clock signal (e.g. 810, 940); and a switching circuit (e.g. switching circuit 470), where the switching circuit is configured to switch a modulation mode when the value of the clock signal at a time t1 is a high clock signal value and the value of the RPM trigger signal at time t1 is a high RPM trigger signal value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 90 degrees) should be interpreted to be "about" the value of the stated number (e.g., about 90 degrees).

In view of the above, it is evident that a novel device and method is disclosed that can, in at least one exemplary embodiment, reduce input filter ripple current without creating voltage disturbances on the output voltage.

As the claims hereinafter reflect, inventive aspects may lie in less than all features of a single foregoing disclosed embodiment. Thus, the hereinafter expressed claims are hereby expressly incorporated into this Detailed Description of a non-limiting sample of exemplary embodiments, with each claim standing on its own as a separate embodiment of an invention. Furthermore, while some exemplary embodiments described herein include some but not other features included in other embodiments, combinations of features of different embodiments are meant to be within the scope of the invention, and form different embodiments, as would be understood by those skilled in the art.

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A method of forming a converter for a power supply system having an output voltage comprising:
   configuring the converter to generate an error signal representative of the output voltage;
   configuring the converter to generate a threshold signal;
   configuring the converter to switch a modulation type from a first modulation mode to a second modulation mode responsively to the error signal passing the threshold signal at a given time, where the first modulation mode is one of an edge modulation mode that forms a PWM (Pulse Width Modulation) signal substantially synchronous with a clock signal or an RPM (Ramp Pulse Modulation) modulation mode that forms the PWM signal substantially non-synchronous with the clock signal, and where the second modulation mode is an other one of the edge modulation mode or the RPM modulation mode and where the edge modulation mode is one of a trailing edge modulation or a leading edge modulation mode.

2. The method according to claim 1, where the condition wherein a error signal passes the threshold signal is at least one of the error signal exceeding the threshold signal or the error signal is lower than the threshold signal.

3. The method according to claim 1, further comprising:
   configuring the converter to generate a trigger signal, where the trigger signal has a trigger signal value, wherein the trigger signal value has a trigger signal negated value or a trigger signal asserted value.

4. The method according to claim 3, further comprising:
   configuring the converter to generate the clock signal, where the clock signal has a clock signal value, wherein the clock signal value has a clock signal negated value or clock signal asserted value.

5. The method according to claim 4, further comprising:
   configuring the converter to switch from the RPM modulation mode to the edge modulation mode responsively to the trigger signal value being the trigger signal asserted value that substantially coincides in time with the clock signal value having the clock signal asserted value.

6. The method according to claim 4, further comprising:
configuring the converter to switch from the RPM modulation mode to the edge modulation mode responsively to the trigger signal value has the trigger signal asserted value that substantially coincides with the clock signal value that has the clock signal asserted value after a timer has expired.

7. The method according to claim 5, further comprising:
configuring the converter to generate a ramp signal responsively to the clock signal value having the clock signal asserted value and the modulation mode being the edge modulation mode.

8. The method according to claim 5, further comprising:
configuring the converter to generate a ramp signal responsively to the trigger signal value having the trigger signal asserted value and the modulation mode being the RPM modulation mode.

9. The method according to claim 6, further comprising:
configuring the converter to generate a ramp signal responsively to the clock signal value having the clock signal asserted value and the modulation mode being the edge modulation mode.

10. The method according to claim 6, further comprising:
configuring the converter to generate a ramp signal responsively to the trigger signal value having the trigger signal asserted value and the modulation mode being the RPM modulation mode.

11. The method according to claim 4, further comprising:
configuring the converter to generate a reset signal, wherein the reset signal can have a reset asserted value or a reset negated value; and
configuring the converter to generate an RPM_GO signal, wherein the RPM_GO signal has a RPM_GO value that is a RPM_GO asserted value or an RPM_GO negated value, wherein when the trigger signal value is the trigger signal asserted value and the clock signal value is the clock signal asserted value and the RPM_GO value is the RPM_GO negated value the reset signal is set to the reset asserted value.

12. The method according to claim 11, further comprising:
configuring the converter to switch the modulation mode responsively to the reset signal having the reset asserted value.

13. A power supply controller comprising:
a RPM (Ramp Pulse Modulation) modulator circuit, that controls a RPM modulation mode and wherein the RPM modulation mode is a first modulation mode;
an Edge modulator circuit, that controls an edge modulation mode that includes forming a PWM (Pulse Width Modulation) signal substantially synchronously to a clock signal wherein the PWM signal has a variable duty cycle, wherein the Edge modulation mode is a second modulation mode; and
a switching circuit, that switches a modulation mode from the second modulation mode to the first modulation mode responsively to an error signal substantially passing a threshold signal wherein the RPM modulation mode forms the PWM control signal substantially non-synchronous to the clock signal.

14. The controller according to claim 13, wherein a condition where the error signal substantially passes the threshold signal is at least one of the error signal exceeds the threshold signal or the error signal is lower than the threshold signal.

15. The controller according to claim 14, further comprising:
a RPM trigger generator, wherein the RPM trigger generator is configured to generate an RPM trigger signal, wherein the trigger signal has a trigger signal value, wherein the trigger signal value has a trigger signal negated value or a trigger signal asserted value.

16. The controller according to claim 15, further comprising:
a timer circuit, wherein the timer circuit generates the clock signal that has a clock signal value, the clock signal value has a clock signal negated value or clock signal asserted value, wherein the switching circuit switches the modulation mode from the RPM modulation mode to a trailing edge modulation mode responsively to the trigger signal value being the trigger signal asserted value that substantially coincides in time with the clock signal value having the clock signal asserted value.

17. The controller according to claim 15, further comprising:
a timer circuit, wherein the timer circuit generates the clock signal that has a clock signal value, wherein the clock signal value has a clock signal negated value or a clock signal asserted value, wherein the switching circuit switches the modulation mode from the RPM modulation mode to the edge modulation mode responsively to the trigger signal value having a trigger signal asserted value that substantially coincides in time with the clock signal value having a clock signal asserted value after a timer has expired.

18. A power supply controller comprising:
a RPM (Ramp Pulse Modulation) trigger circuit, wherein the RPM trigger circuit generates an RPM trigger signal;
a timer circuit, wherein the timer circuit generates a clock signal; and
a switching circuit, wherein the switching circuit is configured to switch a modulation mode from a synchronous mode having a PWM (Pulse Width Modulation) signal that is formed substantially synchronous with the clock signal to a non-synchronous RPM modulation mode that forms the PWM signal substantially non-synchronously with the clock signal wherein the modulation mode switch occurs substantially responsively to a state of the clock signal and a state of the RPM trigger signal.

19. The controller according to claim 18, further comprising:
an error signal circuit, wherein the error signal circuit generates an error signal and wherein a synchronizer is configured to switch the modulation mode responsively to the error signal substantially passing a threshold signal.

20. The controller according to claim 19, wherein the modulation mode is at least one of the non-synchronous RPM modulation mode, a synchronous trailing edge modulation mode that is synchronous with the clock signal, or a synchronous leading edge modulation mode that is synchronous with the clock signal.

* * * * *